(12) United States Patent
Aly

(10) Patent No.: US 11,120,725 B2
(45) Date of Patent: Sep. 14, 2021

(54) METHOD AND APPARATUS FOR COLOR GAMUT MAPPING COLOR GRADIENT PRESERVATION

(71) Applicant: Advanced Micro Devices, Inc., Santa Clara, CA (US)

(72) Inventor: Essam Aly, Santa Clara, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 15/961,037

(22) Filed: Apr. 24, 2018

(65) Prior Publication Data

US 2019/0325802 A1 Oct. 24, 2019

(51) Int. Cl.
*G09G 3/20* (2006.01)

(52) U.S. Cl.
CPC ...... *G09G 3/2003* (2013.01); *G09G 2320/0233* (2013.01); *G09G 2320/0242* (2013.01); *G09G 2340/0407* (2013.01); *G09G 2340/06* (2013.01)

(58) Field of Classification Search
CPC ......... G09G 3/2003; G09G 2340/0407; G09G 2320/0233; G09G 2340/06; G09G 2320/024
See application file for complete search history.

(56) References Cited

U.S. PATENT DOCUMENTS

| | | | |
|---|---|---|---|
| 5,809,213 A | 9/1998 | Bhattacharjya | |
| 7,177,465 B1 * | 2/2007 | Takahira | H04N 1/6058 358/1.9 |
| 2006/0119870 A1 * | 6/2006 | Ho | H04N 1/6058 358/1.9 |
| 2007/0080974 A1 | 4/2007 | Edge | |
| 2009/0154803 A1 * | 6/2009 | Mizukura | H04N 1/6058 382/166 |
| 2013/0050245 A1 * | 2/2013 | Longhurst | H04N 9/67 345/590 |
| 2013/0222408 A1 | 8/2013 | Lee | |
| 2014/0002480 A1 * | 1/2014 | Bhaskaran | H04N 1/6027 345/590 |
| 2014/0118387 A1 | 5/2014 | Kim | |

(Continued)

OTHER PUBLICATIONS

Han, Dongil; Real-Time Color Gamut Mapping Method for Digital TV Display Quality Enhancement; IEEE; Feb. 29, 2004.

(Continued)

*Primary Examiner* — Kee M Tung
*Assistant Examiner* — Khoa Vu
(74) *Attorney, Agent, or Firm* — Faegre Drinker Biddle & Reath LLP

(57) ABSTRACT

A method and apparatus for gamut mapping color gradient preservation is described. In one example, the method and apparatus obtains a source image having a plurality of source color gamut pixels in a source color gamut, wherein the plurality of source color gamut pixels include a same hue value and a same luminance value and define a color gradient, and converts the plurality of source color gamut pixels to a plurality of target color gamut pixels such that the color gradient of the plurality of source color gamut pixels is preserved by the plurality of target color gamut pixels in a target color gamut. The method and apparatus provides the plurality of target color gamut pixels for display on a target color gamut display.

20 Claims, 11 Drawing Sheets

(56) References Cited

U.S. PATENT DOCUMENTS

| | | |
|---|---|---|
| 2015/0243200 A1 | 8/2015 | Pan |
| 2015/0248747 A1 | 9/2015 | Atkins |
| 2016/0379595 A1* | 12/2016 | Stauder .................. H04N 9/643 |
| | | 345/590 |
| 2017/0041507 A1 | 8/2017 | Chen |
| 2018/0350322 A1 | 12/2018 | Marcu |

OTHER PUBLICATIONS

Lee, Hak-Sung et al.; A Real Time Color Gamut Mapping Using Tetrahedral Interpolation for Digital TV Color Reproduction Enhancement; IEEE; Oct. 25, 2008.
Sikudova, Elena et al.; A Gamut Mapping Framework for Color-Accurate Reproduction of HDR Images; Nov. 24, 2017.
Kang; Henry R.; Chapter 9 Three-Dimensional Lookup Table with Interpolation; May 17, 2006.
Wowow Entertainment; What is LUT?; 2016.
Wikipedia; Linear Interpolation; Mar. 9, 2018.
Ljubuncic; Goran; Using Luts? Here is What You Need to Know; from lutify.me; Aug. 2016.
What is a LUT?; from lightillusion.com; Jul. 2018.
Wikipedia; Rec. 2020; Jun. 21, 2018.
Wikipedia; Rec. 709; Jul. 17, 2018.
Wikipedia; ICtCp; Jun. 5, 2018.
International Telecommunication Union; High dynamic range television for production and international programme exchange; Report ITU-R BT.2390-3; Oct. 2017.

\* cited by examiner

Gamut Mapping Color Gradient Preservation Table

METHOD AND APPARATUS FOR COLOR GAMUT MAPPING COLOR GRADIENT PRESERVATION

BACKGROUND OF THE DISCLOSURE

Recent improvements in monitors, television screens, and/or other display screens allow users to view movies and/or images in higher definition settings. For example, whereas some monitors and/or other display screens may only be able to show movies and images in high definition (HD) or standard definition (SD), other monitors and/or other display screens may show movies and images in ultra high definition (UHD). However, higher definition settings, such as settings with high luminance levels and/or very wide color gamuts (e.g., UHD), may require additional resources and/or processing to display on a device with a limited luminance range and/or narrower color gamut. For instance, UHD movies and images may use 10 or 12 bit red, green, blue (RGB) channel values to display color. However, HD or SD displays may only use 8 bit RGB channel values to reproduce the content colors. Thus, some monitors and/or other display screens might not have the capability to display UHD movies and/or images.

To allow UHD movies and/or images to be shown on HD or SD display screens, image processors, such as graphics processing units (GPUs), central processing units (CPUs), application-specific integrated circuits (ASICs), and other processors, may implement a technique called "clipping" to show UHD movies. For instance, a UHD display screen may be able to display a color gamut that includes ten different shades of red, but an HD display screen may be able to display a color gamut that includes only six of the ten shades of red. Thus, the graphics processing units may "clip" the out of gamut colors (e.g., the four shades of red not able to be displayed by the HD display screen) and map these out of gamut colors to a single color (e.g., a single shade of red within the HD color gamut at a chroma boundary or edge of the HD color gamut). However, clipping UHD video frames and/or images causes the images to be distorted, thus creating an unfavorable viewing experience for the user. Accordingly, there exists a need for one or more improved methods and apparatuses in order to address one or more of the above-noted drawbacks.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF EMBODIMENTS

Figure 1:
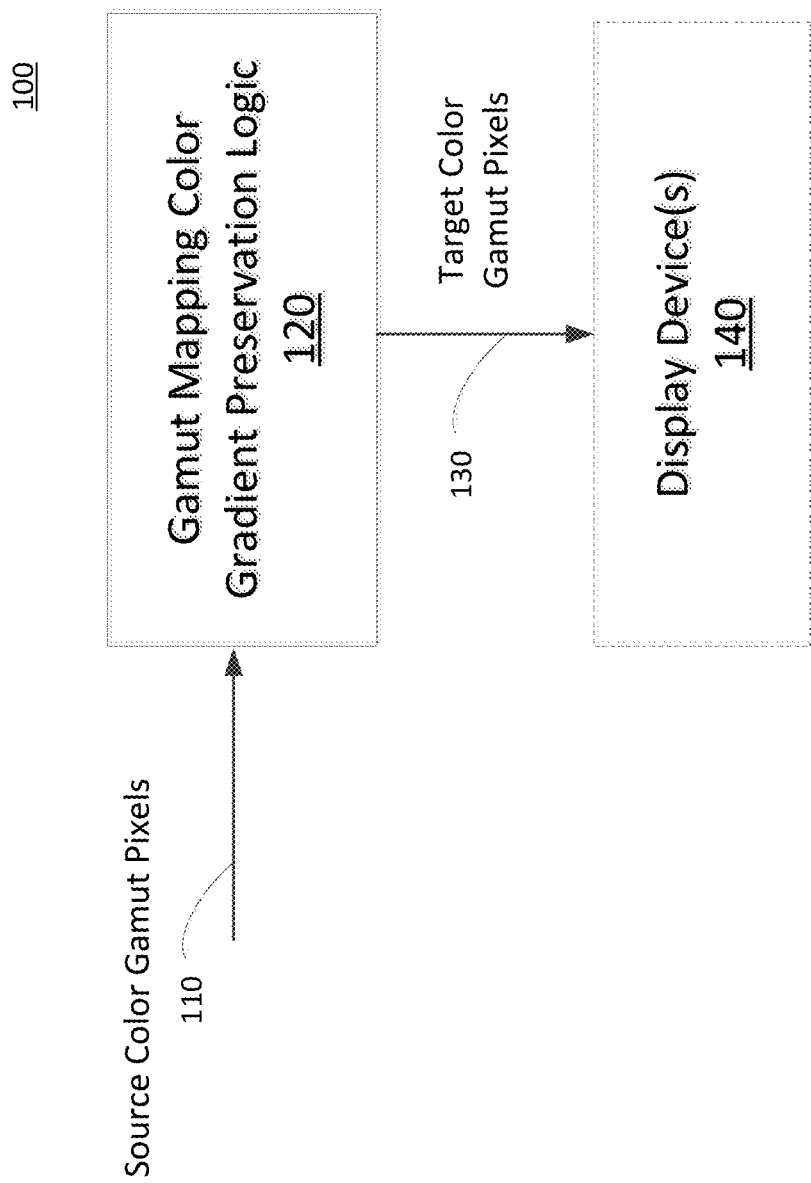
FIG. 1 is a schematic block diagram illustrating an apparatus for mapping between color gamuts in accordance with one embodiment set forth in the disclosure.

Briefly, in some examples, a method and apparatus provides color gamut mapping that preserves color gradient perceptions between out of color gamut gradients and in-gamut color gradients. Gamut mapping describes mapping or converting pixels from one color gamut, such as a source (e.g., High Dynamic Range [HDR] or ultra high definition [UHD]) color gamut, to another color gamut that is more limited, such as a target (e.g., Standard Dynamic Range [SDR] or high definition [HD]) color gamut. A pixel within the color gamut includes values that describe the pixel's color, such as a hue value, a luminance value, and a chroma value.

In some implementations, the method and apparatus obtains a source image, such as a video frame, movie frame, or an image. The source image is in a color gamut that cannot be entirely displayed by a display device. For example, the source image is in a UHD color gamut whereas the display device can only display SD or HD color gamuts. The method and apparatus determines hue, luminance, and chroma values for the pixels of the source image. The hue, luminance, and chroma values define a color within the luminance, chroma, and hue (lCh) color space. Using these values, the method and apparatus maintains the luminance and hue values for the pixels (e.g., such as a result from a luminance mapping operation), but changes or converts the chroma values for the pixels. The converted chroma values are within a color gamut that can be displayed by the display device.

In some examples, the method and apparatus, obtains a source image having a plurality of source color gamut pixels in a source color gamut. The plurality of source color gamut pixels includes a same hue value and a same luminance value and defines a color gradient (e.g., chroma values of at least two out of gamut pixels). The method and apparatus converts the plurality of source color gamut pixels to a plurality of target color gamut pixels such that the color gradient of the plurality of source color gamut pixels is preserved by the plurality of target color gamut pixels in a target color gamut. The method and apparatus provides, for display, the plurality of target color gamut pixels (e.g., one or more pixels) on a target color gamut display.

In some implementations, the method and apparatus maps the source color gamut pixels into a range (also referred to as a "belt") within the target color gamut. Further, the method and apparatus obtains, from memory and based on the same hue value and the same luminance value, a target edge chroma value for a boundary of the target color gamut. The range within the target color gamut is less than an entire area of the target color gamut and is adjacent to the boundary of the target color gamut. The method and apparatus determines, based on the same hue value and the same luminance value, a compression ratio for preserving transformations from the source color gamut to the target color gamut. The compression ratio is used to map the source color gamut pixels into the range within the target color gamut. The method and apparatus determines the compression ratio based on at least one of a linear fit or a best fit curve.

In some implementations, the method and apparatus performs a luminance mapping operation to generate the plurality of source color gamut pixels that includes the same hue value and the same luminance value.

In some examples, the method and apparatus determines, based on the plurality of source color gamut pixels, a plurality of source chroma values that are within the target color gamut. The method and apparatus maintains the plurality of source chroma values for source gamut pixels that are within the target color gamut.

In some examples, in a pre-processing operation, the method and apparatus obtains source metadata, such as valid red green blue (RGB) values, corresponding to the plurality of source color gamut pixels. The method and apparatus obtains target display data, such as extended display identification data (EDID) and/or valid RGB values, corresponding to the target color gamut display. The method and apparatus generates, based on the source metadata and the target display data, a gamut mapping color gradient preservation table for preserving transformations from the source color gamut to the target color gamut. The method and apparatus converts the plurality of source color gamut pixels to the plurality of target color gamut pixels based on the gamut mapping gradient preservation table.

In some implementations, for each hue value and each luminance value, the method and apparatus generates an entry in the gamut mapping color gradient preservation table. To determine boundary or edge values of the source color gamut and the target color gamut, the method and apparatus creates test pixels to determine whether a sample chroma value converts back to a valid RGB value. A valid RGB value identifies whether the hue, chroma, luminance values are within a target color gamut.

If any of the RGB triplet values are invalid, then the sample chroma value falls outside the particular color gamut. If the RGB triplet values are valid, then the sample chroma value falls inside the color gamut. The method and apparatus continues to create test pixels until it determines a valid source chroma value (e.g., a source edge chroma value) and a valid target chroma value (e.g., a target edge chroma value). The method and apparatus then stores these target edge and source edge chroma values into the corresponding entries in the gamut mapping color gradient preservation table.

FIG. 1 illustrates one example of an apparatus 100, such as an image processing device, for preserving color gradients during gamut mapping. In some implementations, the apparatus 100 includes any type of computing device suitable for implementing aspects of embodiments of the disclosed subject matter. Examples of computing devices include but are not limited to "workstations," "servers," "cloud computing platforms", "laptops," "desktops," "tablet computers," "hand-held devices," "game consoles," "general-purpose graphics processing units (GPGPUs)," "APUs," "CPUs," "GPUs," "state machines," printers, integrated circuits and the like, all of which are contemplated within the scope of FIG. 1, with reference to various components of the apparatus 100.

In one example, the apparatus 100 includes gamut mapping color gradient preservation logic 120 and display device(s) 140. In such examples, the display device 140 includes one or more monitors, television screens, and/or other display screens that display and/or show video frames, movies, and/or images. The display device 140 obtains pixels (e.g., target color gamut pixels 130) and/or displays the target color gamut pixels 130. The gamut mapping color gradient preservation logic 120 is any suitable logic configuration including, but not limited to, one or more state machines, one or more digital signal processors, GPUs, APUs or processors that execute kernels, and/or other suitable structure as desired. The gamut mapping color gradient preservation logic 120 preserves and/or maintains color gradients between portions of an image having chroma values and in-gamut chroma values of a target display(s) during gamut mapping (e.g., during pixel conversions from a source color gamut to a target color gamut).

In some variations, the apparatus 100 optionally includes display device(s) 140. When present, the gamut mapping color gradient preservation logic 120 and the display device (s) 140 are in the same apparatus. However, some apparatuses, such as cloud computing platforms, servers, and/or integrated circuits, may not include a display device. In such apparatuses, the gamut mapping color gradient preservation logic 120 obtains characteristics (primaries, max luminance, etc.) of the display device 140 (e.g., device medium) that will display the image. Additionally, and/or alternatively, the gamut mapping color gradient preservation logic defaults to a standard target color gamut, such as the BT 709 or the DCI-P3 color gamut. After converting the pixels from the source to target color gamut, the gamut mapping color gradient preservation logic 120 transmits and/or sends image data via the internet, wirelessly via wired buses, or through any suitable manner to one or more additional apparatuses that house the display device(s) 140.

The illustrative apparatus 100 shown in FIG. 1 is not intended to suggest any limitation as to the scope of use or functionality of embodiments of the present disclosure. Neither should the illustrative apparatus 100 be interpreted as having any dependency or requirement related to any single component or combination of components illustrated therein. Additionally, various components depicted in FIG. 1 are, in embodiments, integrated with various ones of the other components depicted therein (and/or components not illustrated), all of which are considered to be within the ambit of the present disclosure.

Figure 2:
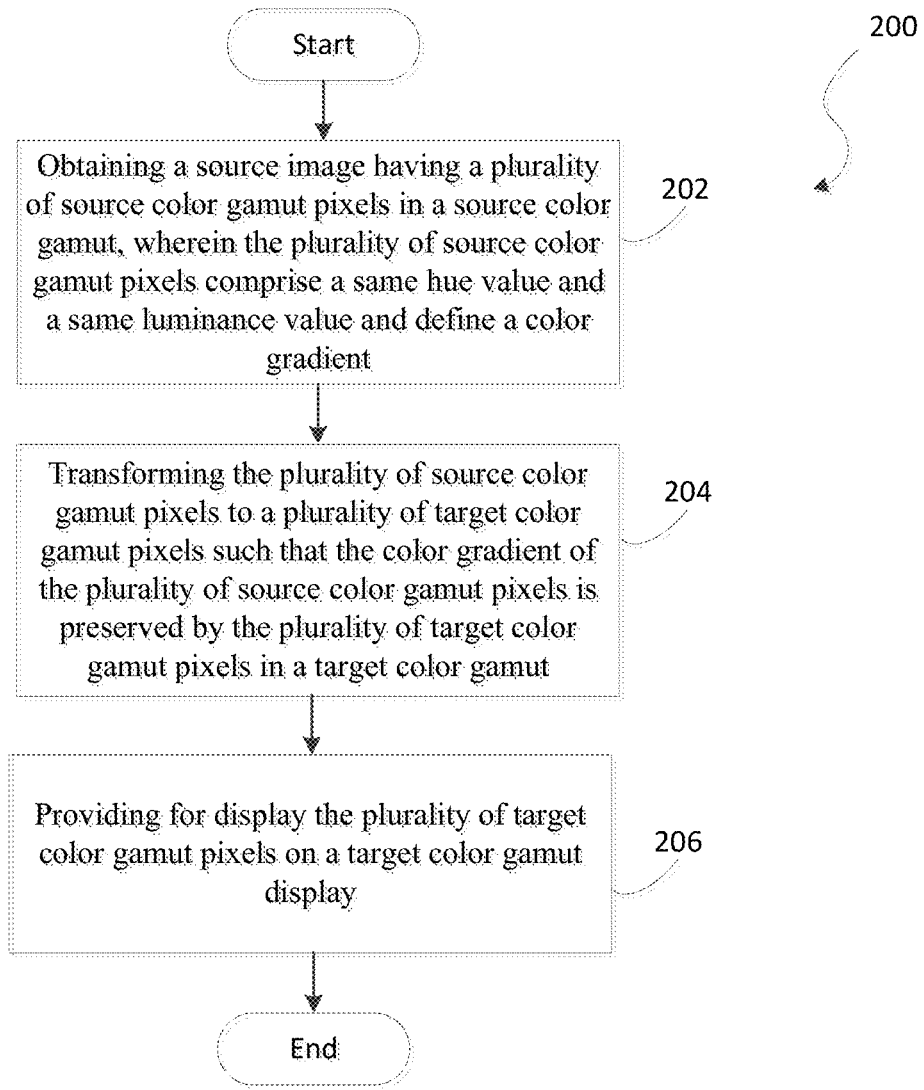
FIG. 2 is a flowchart illustrating a method for mapping between color gamuts in accordance with one embodiment set forth in the disclosure.

FIG. 2 illustrates one example of a method for preserving and/or maintaining color gradients during gamut mapping. FIG. 2 is described below in reference to the apparatus 100 illustrated in FIG. 1. However, any suitable structure can be employed. In operation, at step 202, the gamut mapping color gradient preservation logic 120 obtains a source image having a plurality of source color gamut pixels in a source color gamut. In some variations, obtaining the source image includes, but is not limited to receiving the source frame(s) from a source image provider and/or retrieving the source image from memory, a server or other source. The source image is for a movie (e.g., a movie frame), a video (e.g., a video frame) and/or an image. The plurality of source color gamut pixels includes a same hue value and a same luminance value and also defines a color gradient. The color gradient (e.g., color ramp or color progression) defines a range of position-dependent colors. The colors of the color gradient vary continuously with position, producing smooth color transitions.

In some implementations, the source image is composed of pixels, such as source color gamut pixels 110. The source color gamut pixels 110 are encoded for a source color gamut, such as an ultra-high definition (UHD) color gamut (e.g., a BT.2020 color gamut, Bt.2100 color gamut, DCI-P3 color gamut, P3 color gamut). For example, in one variation, the source color gamut includes one hundred different shades of red. However, the display device 140 has a target (e.g., more limited) color gamut, such as a standard definition (SD) and/or a high definition (HD) color gamut (e.g., Rec.709 color gamut, Adobe RGB 1998 color gamut, BT 709 color gamut, sRGB color gamut, or additional color gamuts that are smaller and/or narrower than the BT. 709 color gamut). For instance, the target color gamut includes sixty shades of red. Due to the limited color gamut display capabilities, the display device 140 is not able to reproduce and display or show the source color gamut pixels 110 in the UHD color gamut (e.g., all one hundred shades of red).

At step 204, the gamut mapping color gradient preservation logic 120 converts the plurality of source color gamut pixels 110 to a plurality of target color gamut pixels 130 such that the color gradient of the plurality of source color gamut pixels 110 is preserved by the plurality of target color gamut pixels 130 in a target color gamut. In some variations, converting the plurality of source color gamut pixels 110 to a plurality of target color gamut pixels 130 includes, but is not limited to, converting and/or mapping the plurality of source color gamut pixels 110 to a plurality of target color gamut pixels 130.

The target color gamut pixels 130 are pixels that can be reproduced and displayed by the display device 140. For example, in some variations, the display device 140 displays a target color gamut that includes sixty shades of red. The display device 140 is able display some of the source color gamut pixels 110 within the target color gamut (e.g., the sixty shades of red in the target color gamut). However, the display device 140 is not able to display other source color gamut pixels 110 outside the target color gamut (e.g., the forty shades of red outside of the target color gamut, but inside the source color gamut). Thus, the logic 120 converts source color gamut pixels 110 (e.g., pixels inside and/or outside the target color gamut) to target color gamut pixels 130 (e.g., pixels all inside the target color gamut). As will be explained in further detail below in FIGS. 9, 10a, and 10b, during the conversion from the source color gamut to the target color gamut, the logic 120 preserves and/or maintains the color gradient (e.g., the range of position-dependent colors) during the conversion from the source color gamut pixels 110 to the target color gamut pixels 130 for pixel colors outside the target color gamut. Therefore, the appearance of the pixels will be perceived on the target color gamut as they were intended to be perceived if they were displayed by a display device with source color gamut capabilities. Thus, creating a perceptual color gamut mapping method.

At step 206, the gamut mapping color gradient preservation logic 120 provides, for display, the plurality of target color gamut pixels on a target color gamut display. In some implementations, after converting the plurality of source color gamut pixels 110 to the plurality of target color gamut pixels 130, the gamut mapping color gradient preservation logic 120 provides (e.g., sends and/or transmits) for display data, such as the target color gamut pixels 130, to the target color gamut display, such as the display device 140. After receiving and/or obtaining the target color gamut pixels 130, the display device 140 displays the target color gamut pixels 130.

In some variations, the gamut mapping color gradient preservation logic 120 uses the perceptual color gamut mapping method to enhance tone mapping and/or the HDR10 viewing experiences for a user. In other variations, the gamut mapping color gradient preservation logic 120 uses the perceptual color gamut mapping method separately from any color processing logic to perceptually map large (tall/wide) gamut volume inside a limited (short/narrow) gamut space.

In some variations, the gamut mapping color gradient preservation logic 120 obtains a plurality of source color gamut pixels for an HDR image or video from a source. Each of plurality of source color gamut pixels has a same hue value and a same luminance value and defines a color gradient. The gamut mapping color gradient preservation logic 120 obtains, from memory, a target edge chroma value and a source edge chroma value for the same hue value and the same luminance value. The gamut mapping color gradient preservation logic 120 compares, on a pixel-by-pixel basis, each pixel of the plurality of source pixels with the target edge chroma value and the source edge chroma value and produces an image array that includes a plurality of target pixel values that preserves the color gradient of the plurality of source color gamut pixels. The gamut mapping color gradient preservation logic 120 converts the image array to an SDR image or video for display on a target display.

Figure 3:
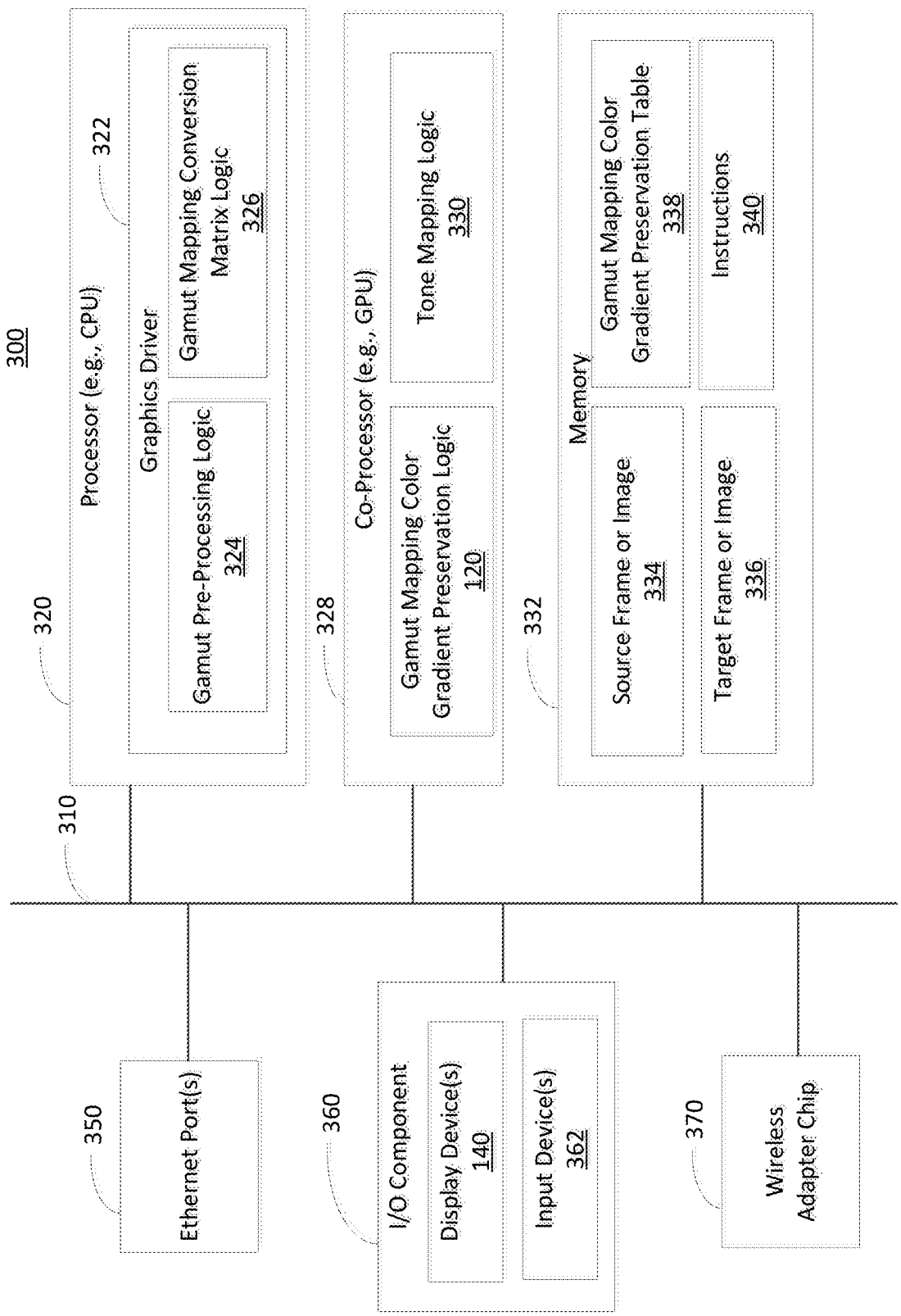
FIG. 3 is a schematic block diagram illustrating another example of an apparatus for mapping between different color gamuts in accordance with one embodiment set forth in the disclosure.

FIG. 3 is a schematic block diagram illustrating another example of an apparatus for preserving color gradients during color gamut mapping. As described above, the method 200 is implemented by the apparatus 100 described in FIG. 1. The apparatus 300, such as an image processing device, illustrates another example apparatus for implementing method 200 and/or other methods in this disclosure. Apparatus 300 includes a bus 310 that, directly and/or indirectly, couples the following devices: a processor 320 (e.g., CPU), a co-processor 328 (e.g., GPU), a memory 332, one or more Ethernet port(s) 350, I/O component(s) 360, and wireless adapter chip(s) 370. Any number of additional components, different components, and/or combinations of components is also included in the apparatus 300. In some implementations, the I/O component(s) 360 include a presentation component configured to present information to a user such as, for example, a touch screen, display device 140, a speaker, a printing device, and/or the like, and/or an input component such as, for example, a microphone, a joystick, a satellite dish, a scanner, a printer, a wireless device, a keyboard, a pen, a voice input device, a touch input device, a touch-screen device, an interactive display device, a mouse, and/or the like.

The bus 310 represents one or more busses (such as, for example, an address bus, data bus, or combination thereof). Similarly, in some implementations, the apparatus 300 includes a number of processors 320 and co-processors 328, a number of memory components 332, a number of Ethernet port(s) 350, a number of I/O components 360, and/or a number of wireless adapter chip(s) 370. Additionally, any number of these components, or combinations thereof, is distributed and/or duplicated across a number of computing devices.

In one example, the processor 320 (e.g., CPU) executes a graphics driver 322 (stored in memory) to cause the processor to direct, operate, and/or control gamut pre-processing logic 324 and/or gamut mapping conversion matrix logic 326. For example, in some variations and described in more detail in FIGS. 4 and 5, the gamut pre-processing logic 324 generates one or more gamut mapping color gradient preservation parameters and/or tables. After generating the one or more gamut mapping color gradient preservation parameters and/or tables, the gamut pre-processing logic 324 provides the parameters and/or tables to memory 332. The memory 332 stores the parameters and/or tables in the gamut mapping color gradient preservation table 338.

The gamut mapping conversion matrix logic 326 generates conversion matrixes, tables, and/or parameters. For example, the gamut mapping conversion matrix logic 326 creates conversion matrixes for converting between different color values and/or color spaces, such as between the red green blue (RGB) color space to the luminance, chroma, and hue (ICh) color space. The high dynamic range (HDR) tone mapping logic 330 uses the conversion matrixes to convert between different color values and/or color spaces. After generating and/or creating the conversion matrixes, the gamut mapping conversion matrix logic 326 sends and/or transmits data, such as the conversion matrixes, to memory 332. The memory 332 stores the data, such as the conversion matrixes.

In one example, the co-processor 328 (e.g., GPU) includes the gamut mapping color gradient preservation logic 120 and the high definition resolution (HDR) tone mapping logic 330 implemented as executing shader code or as discrete logic if desired. As explained above in FIGS. 1 and 2 and will be explained in further detail below, the gamut mapping color gradient preservation logic 120 preserves and/or maintains color gradients during gamut mapping (e.g., during pixel conversions from a source color gamut to a target color gamut). Additionally, the tone mapping logic 330 converts between different color spaces and/or values. For instance, the tone mapping logic 330 uses the conversion matrixes (generated by the gamut mapping conversion matrix logic 326) to convert between different color spaces and/or values. The method for converting between different color spaces and/or values is explained in further detail below.

In one example, the memory 332 stores source frame(s) or image(s) 334, target frame(s) or image(s) 336, gamut mapping color gradient preservation table 338, and/or computer-executable instructions 340 that when executed cause the processor 320 and co-processor 328 to implement aspects of embodiments of apparatus components discussed herein and/or to perform aspects of embodiments of methods and procedures discussed herein. The memory 332 may be RAM, ROM, or any suitable memory.

In some implementations, the source frame or image 334 includes the source color gamut pixels 110 as described in FIG. 1. The memory 332 receives, retrieves, and/or obtains the source frame or image 334 from the internet via the Ethernet port(s) 350 and/or the wireless adapter chip(s) 370. Additionally, and/or alternatively, the source frame or image 334 is a frame buffer that stores video or movie frames and/or images.

In some implementations, the target frame or image 336 includes the target color gamut pixels 130 as described in FIG. 1. The memory 332 stores and provides access to the target frame or image 336 from the gamut mapping color gradient preservation logic 120. Additionally, and/or alternatively, the target frame or image 336 is stored in a frame buffer that stores video or movie frames and/or images.

The illustrative apparatus 300 shown in FIG. 3 is not intended to suggest any limitation as to the scope of use or functionality of embodiments of the present disclosure. Neither should the illustrative apparatus 300 be interpreted as having any dependency or requirement related to any single component or combination of components illustrated therein.

Figure 4:
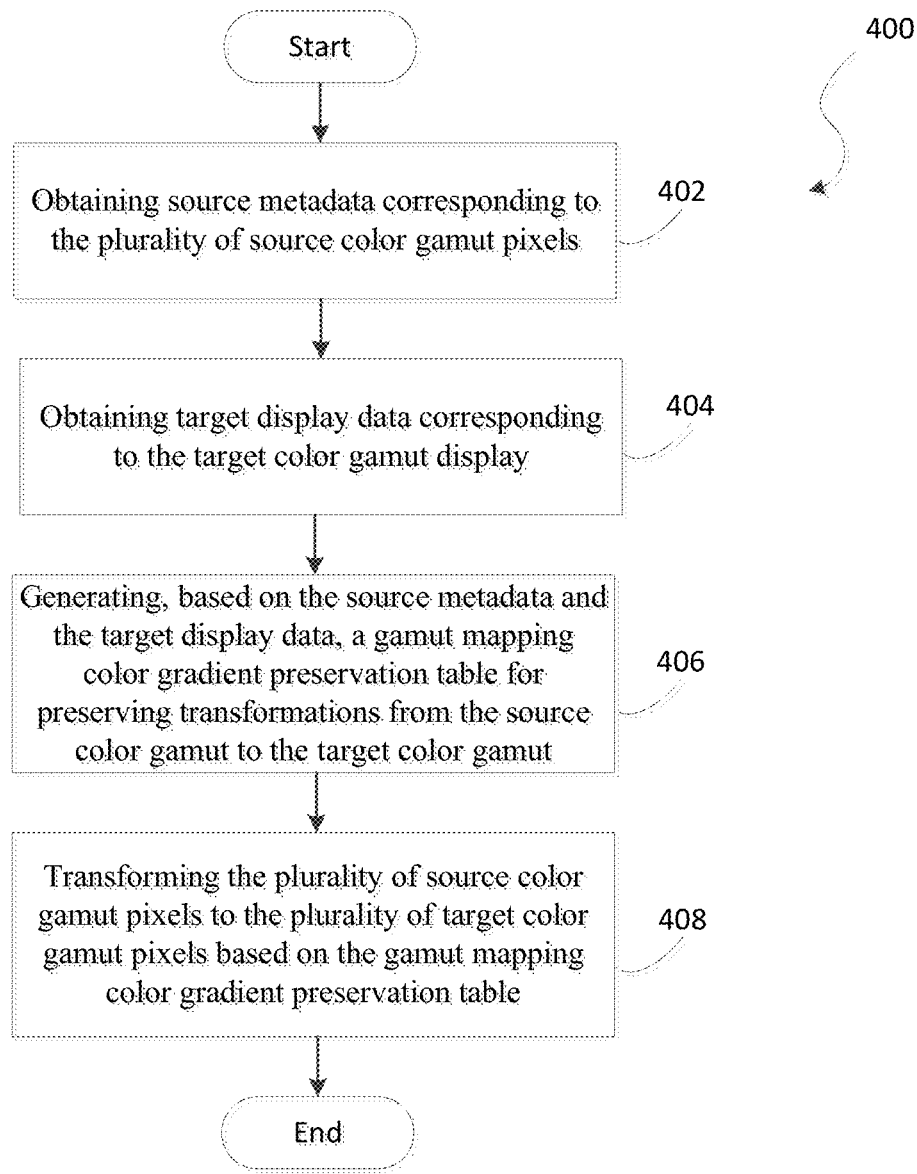
FIG. 4 is a flowchart illustrating another method for mapping between color gamuts in accordance with one embodiment set forth in the disclosure.

FIG. 4 is one example of a method 400 for generating gamut mapping color gradient preservation table and/or parameters. FIG. 4 will be described with reference to FIGS. 5, 6, and 7. For example, steps 402, 404, and 406 will be described with reference to FIG. 5. Step 408 will be described with reference to FIGS. 6 and 7. However, any suitable structure can be employed. For example, in some variations, rather than the gamut pre-processing logic 324 being in apparatus 300, the gamut pre-processing logic 324 is in a server, peer device, other device, and/or a cloud computing platform. After performing the method 400, the gamut pre-processing logic 324 can transmit and/or send the gamut mapping color gradient preservation table to apparatus 300, and the apparatus 300 can store the table in memory 332.

Figure 5:
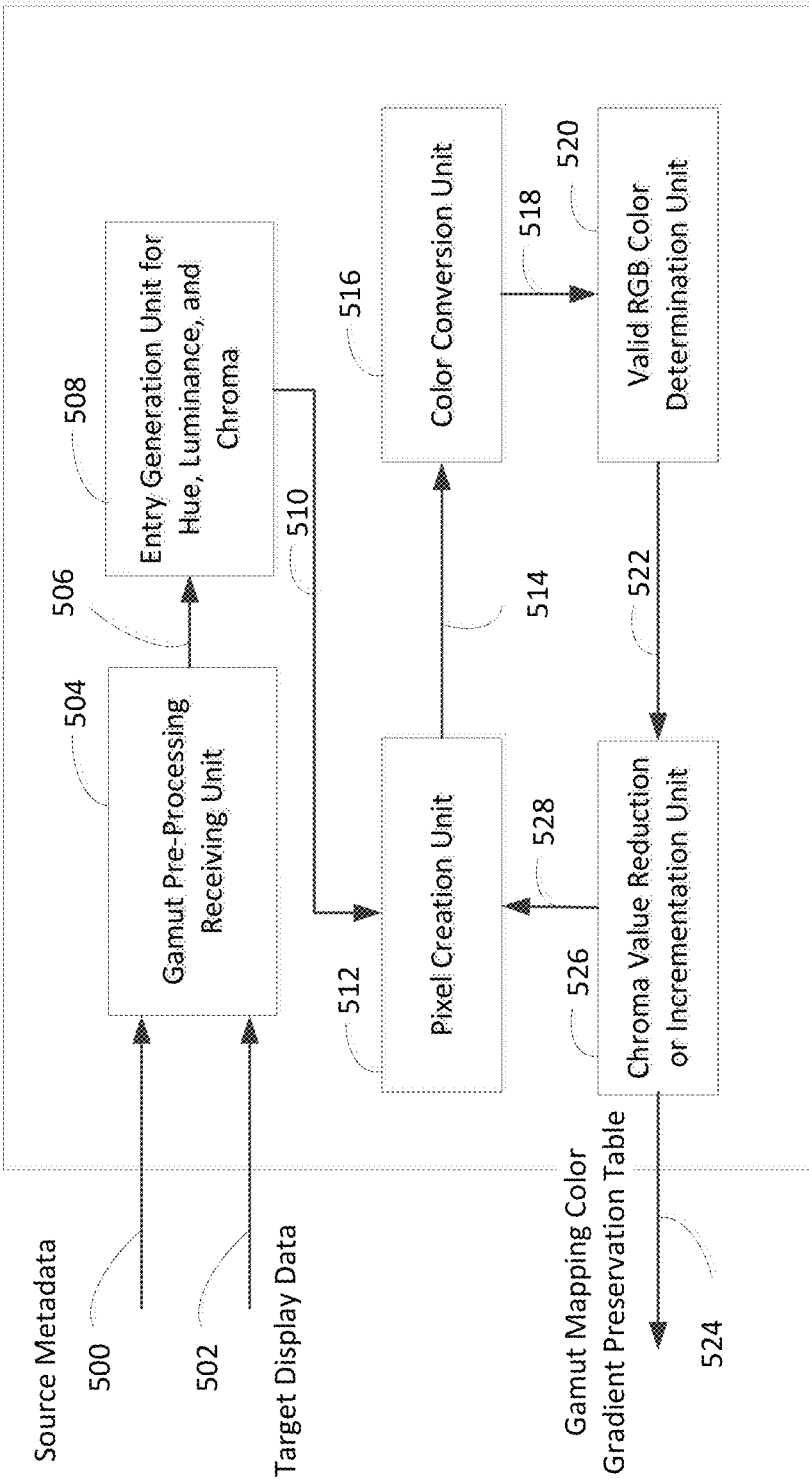
FIG. 5 is a block diagram illustrating another apparatus for mapping between color gamuts in accordance with one embodiment set forth in the disclosure.
Figure 6:
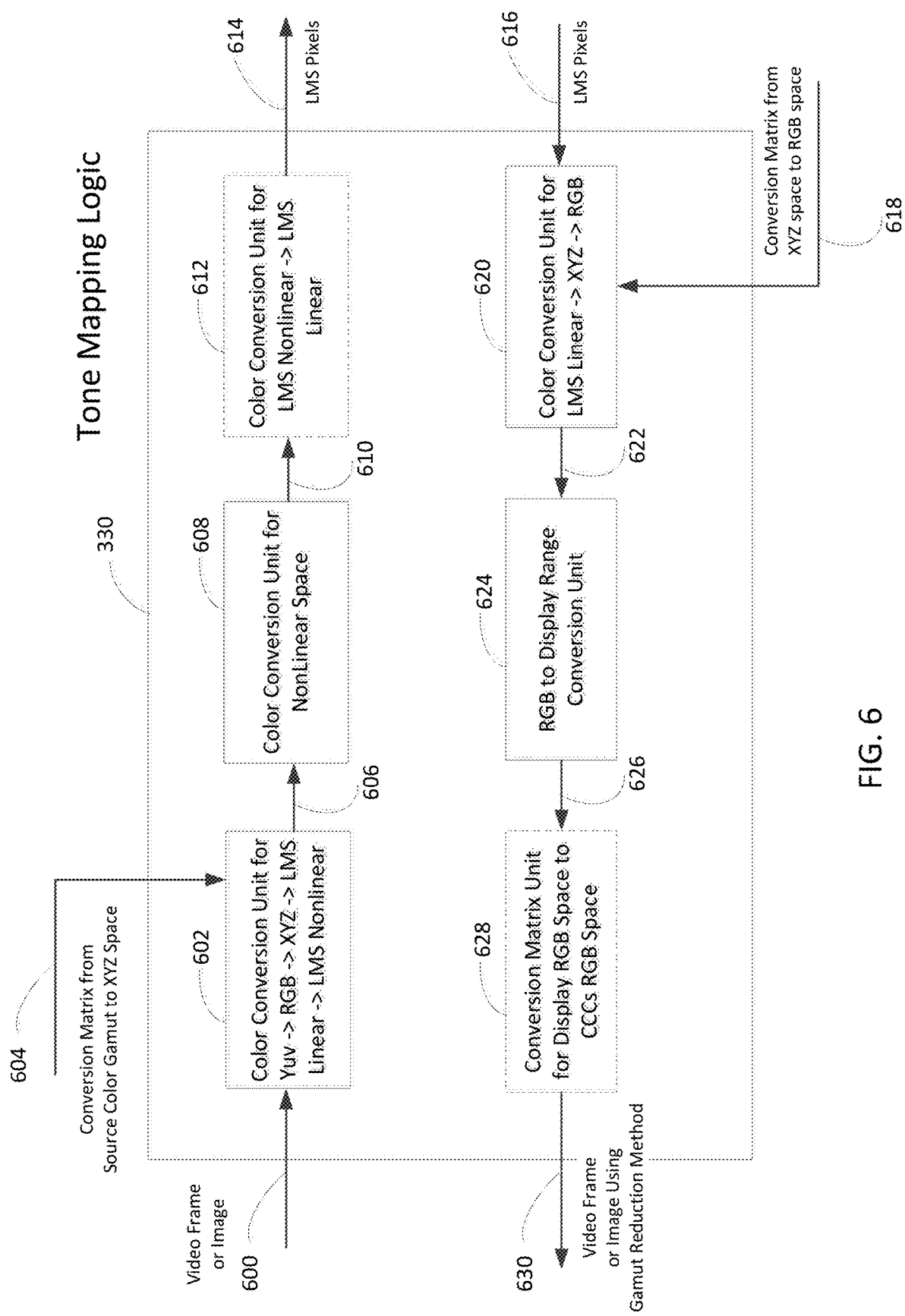
FIG. 6 is a block diagram illustrating another apparatus for mapping between color gamuts in accordance with one embodiment set forth in the disclosure.
Figure 7:
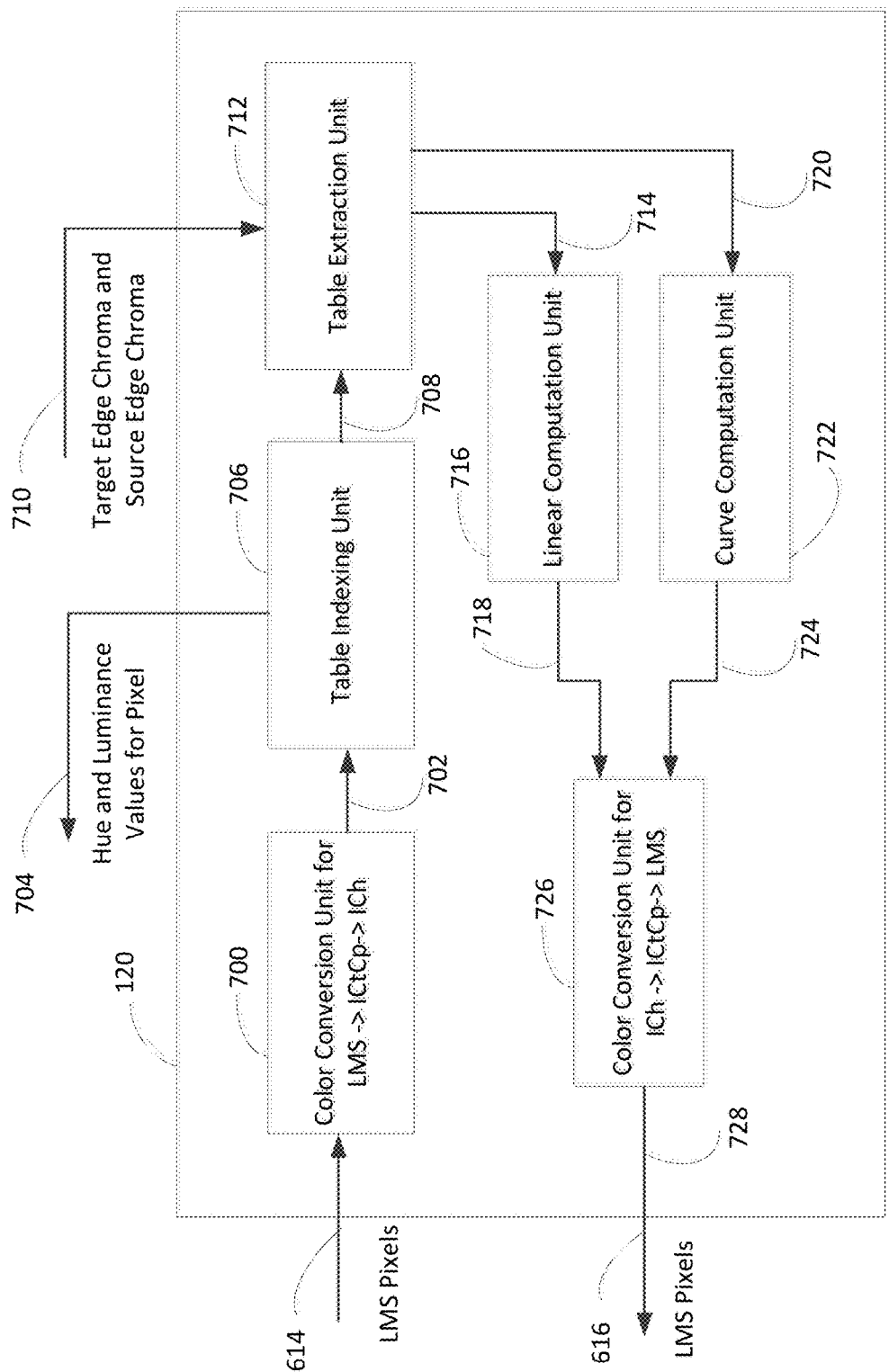
FIG. 7 is a block diagram illustrating another apparatus for mapping between color gamuts in accordance with one embodiment set forth in the disclosure.

FIG. 5 illustrates an example gamut pre-processing logic 324. Embodiments of the present disclosure, including FIGS. 5, 6, and 7, are described below by way of example only, with reference to the accompanying drawings. Further, the following description is merely exemplary in nature and is in no way intended to limit the disclosure, its application, or uses. As used herein, the term "unit" refers to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present system should not be so limited since other modifications will become apparent to the skilled practitioner.

The gamut pre-processing logic 324 includes a gamut pre-processing receiving unit 504, entry generation unit for hue, luminance, and chroma 508, pixel creation unit 512, color conversion unit 516, valid RGB color determination unit 520, and chroma value reduction or incrementation unit 526. Although these sub-units 504, 508, 512, 516, 520, and 526 are illustrated as children units subordinate of the parent unit, each sub-unit can be operated as a separate unit from the gamut pre-processing logic 324, and other suitable combinations of sub-units are contemplated to suit different applications. In another implementation, one or more units can be selectively bundled as a software model running on the processor or co-processor. In some implementations, the gamut pre-processing logic 324 is separate from the gamut mapping color gradient preservation logic 120. In other implementations, the gamut mapping color gradient preservation logic 120 and the gamut pre-processing logic 324 are combined to a single unit or logic. Further, in yet additional implementations, the gamut mapping color gradient preservation logic 120 includes one or more sub-units (e.g., sub-units 504, 508, 512, 516, 520, and/or 526) of the gamut pre-processing logic 324.

Referring back to FIG. 4, in operation, at step 402, the gamut pre-processing logic 324 obtains source metadata corresponding to the plurality of source color gamut pixels. At step 404, the gamut pre-processing logic 324 obtains target display data corresponding to the target color gamut display. For example, the gamut pre-processing receiving unit 504 obtains (e.g., receives and/or retrieves) the source metadata 500 and/or the target display data 502. After obtaining the source metadata 500 and/or the target display data 502, the gamut pre-processing receiving unit 504 transmits or sends data 506, such as the source metadata 500 and/or the target display data 502, to the entry generation unit for hue, luminance, and chroma 508.

In some implementations, the source metadata 500 includes data representing features and/or attributes of the source color gamut pixels 110. For example, the source metadata 500 includes gamut identification information for the source color gamut pixels 110 (e.g., primary xyY coordinates or a standard gamut name or color space name used to determine the primary coordinate information) and/or metadata indicating the luminance level and/or black level for the source color gamut pixels 110.

In some implementations, the target display data 502 includes data representing features and/or attributes for a display device, such as display device 140. For example, the target display data 502 includes extended display identification data (EDID) information about the display device 140. The EDID information can include parameters, such as luminance level, black level, and/or primary xyY values corresponding to the display device 140. These parameters are used to determine the target gamut volume and/or edges.

At step 406, the gamut pre-processing logic 324 generates, based on the source metadata and the target display data, a gamut mapping color gradient preservation table for preserving transformations from the source color gamut to the target color gamut. For example, referring back to FIG. 5, the entry generation unit for hue, luminance, and chroma 508 obtains (e.g., receives and/or retrieves) the data 506, such as the source metadata 500 and/or the target display data 502. After obtaining the data, the entry generation unit for hue, luminance, and chroma 508 generates a plurality of entries for a plurality of hues and a plurality of luminance levels. For instance, after generating the gamut mapping color gradient preservation table and/or the gamut mapping color gradient preservation parameters, the entry generation unit for hue, luminance, and chroma 508 populates the table and/or parameters with the plurality of entries.

Figure 8:
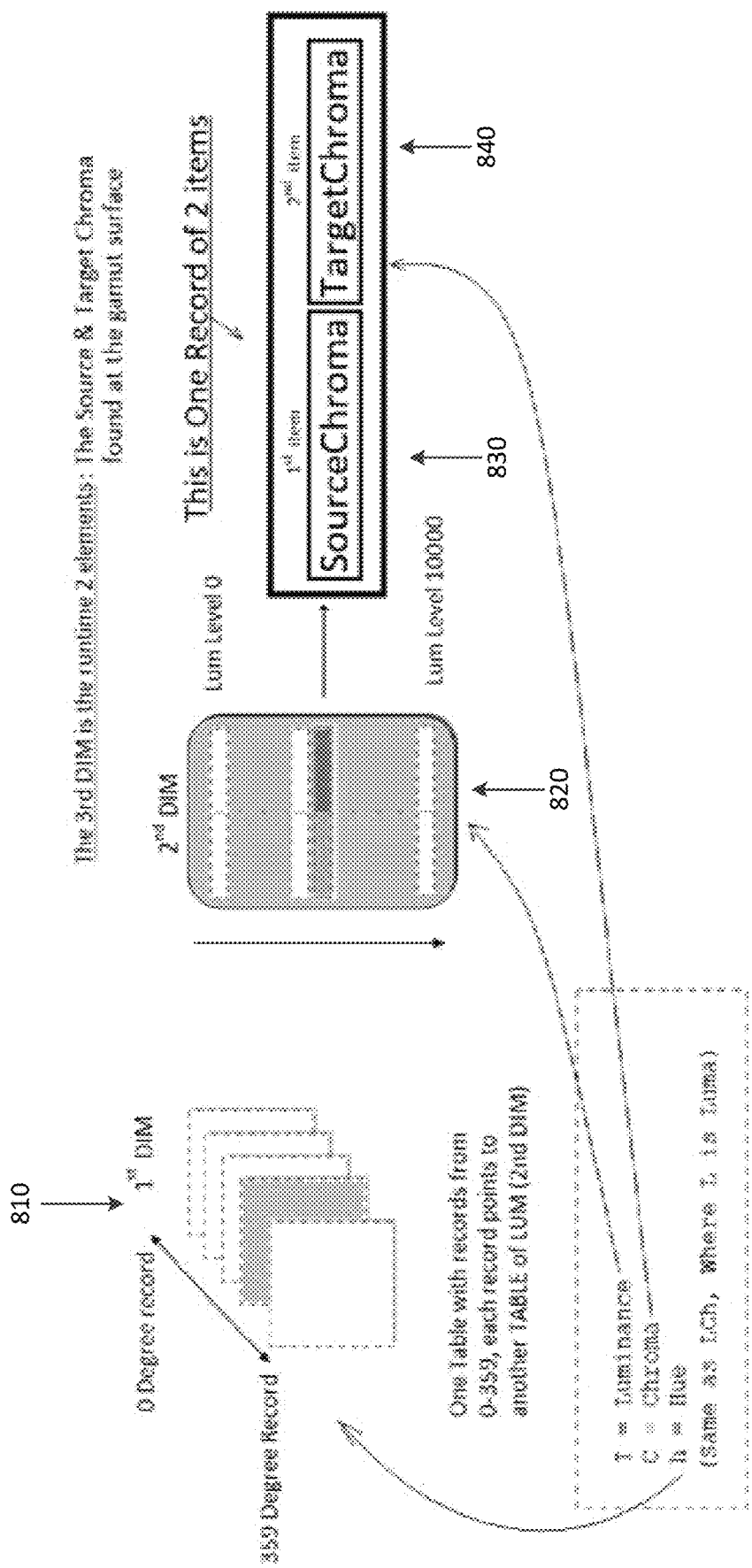
FIG. 8 is an exemplary pictorial representation of a gamut mapping color gradient preservation table in accordance with one embodiment set forth in the disclosure.

In some variations, the entry generation unit for hue, luminance, and chroma 508 generates an entry for each hue value and each luminance value. FIG. 8 illustrates one example of a gamut mapping color gradient preservation table. Referring to FIG. 8, the gamut mapping color gradient preservation table includes a plurality of entries. Each entry includes a hue value 810, a luminance value 820, a source edge chroma value 830, and a target edge chroma value 840. Similar to red, green, blue (RGB) values, hue, luminance, and chroma values describe colors within a color space. In some variations, the luminance, hue, and chroma values vary depending on the color space used for the conversion. For example, ICh and LCh might use different scaled values to represent the same shade of red. Additionally, and/or alternatively, the ICh color values derived from the ICtCp color space might differ from the ICh color values derived from the IPT color space. The source edge chroma value 830 and the target edge chroma value 840 are at the edge or the surface of the source and target color gamuts respectively (e.g., the maximum chroma value for the source and target color gamut).

Hue values represent properties and mixtures of perceived colors. In one example, hue values represent portions of a color wheel with 360 degrees. Thus, the hue values range from 0 to 359. The colors red, yellow, green blue, purple, and mixes of these colors can be spread around at various points within the color wheel.

Luminance values represent brightness or darkness of the color. In one example, luminance values can represent brightness or darkness from 0 to 10,000 nits. For example, a luminance value of 0 nits indicates a very dark color (e.g., black), whereas a luminance value of 10,000 nits indicates a very bright color (e.g., white).

Chroma values represent the colorfulness, purity, intensity, or saturation of the color. In one example, high chroma values can represent a high saturation of the color (e.g., a fire-engine red). Middle chroma values can represent a medium saturation of the color (e.g., brick red). Low chroma values can represent a low Saturday of the color (e.g., a gray or neutral color).

In some examples, such as the example shown on FIG. 8, the hue values 810 range from 0 to 359 degrees. Further, the luminance values range from 0 nits to 10,000 nits. However, any suitable range can be used. The entry generation unit for hue, luminance, and chroma 508 generates an entry for each unique hue value (0-359) and for each unique luminance value. Additionally, in each entry, the entry generation unit for hue, luminance, and chroma 508 generates a register or location in memory to store a source edge chroma value 830 and a target edge chroma value 840. As will be explained below, the gamut pre-processing logic 324 uses a test pixel to determine the source edge chroma value 830 and the target edge chroma value 840 and stores these values into the plurality of entries.

Referring back to FIG. 5, the entry generation unit for hue, luminance, and chroma 508 transmits or sends data 510, such as the table with the entries, the source metadata 500, and the target display data 502, to the pixel creation unit 512. The pixel creation unit 512 obtains (e.g., receives and/or retrieves) the data 510, and uses the data 510 to create a test pixel. The test pixel is used to determine valid chroma values (e.g., the source edge chroma value 830 and the target edge chroma value 840) for each of the entries. In some implementations, for each entry, the pixel creation unit 512 can create two test pixels—one to determine the source edge chroma value 830 and another to determine the target edge chroma value 840. Each test pixel also includes a test chroma value. In some implementations, the gamut pre-processing logic 324 can test the test pixels separately (e.g., one at a time). In other implementations, the gamut pre-processing logic 324 can test both test pixels simultaneously (e.g., both at the same time).

After creating the test pixels, the pixel creation unit 512 transmits or sends data 514, such as the test pixel, to the color conversion unit 516. The color conversion unit 516 converts the hue, luminance, and chroma values of the test pixel to RGB values.

After converting these to RGB values, the color conversion unit 516 sends or transmits data 518, such as the RGB values, to the valid RGB color determination unit 520. The valid RGB color determination unit 520 determines whether the test chroma value for the test pixel converts to a valid RGB value. In other words, the valid RGB color determination unit 520 determines whether the hue, luminance, and test chroma value for each test pixel converts to a valid RGB value that can be displayed within the source color gamut (e.g., UHD color gamut) and/or the target color gamut (e.g., SD or HD color gamut). As mentioned previously, the source metadata 500 and the target display data 502 includes valid RGB values for the source color gamut and the target color gamut respectively. In some variations, the valid RGB color determination unit 520 determines that the test pixel successfully converts to a valid RGB value if each of the RGB values is between and/or including 0.0 and 1.0. The range 0.0 to 1.0 is the range of valid values of a particular color in the RGB domain.

The valid RGB color determination unit 520 then sends or transmits data 522, such as the RGB values, the chroma, hue, luminance values, and/or whether the pixel converts to a valid RGB value, to the chroma value reduction or incrementation unit 526. The chroma value reduction or incrementation unit 526 reduces or increments the test chroma value for the test pixel.

In some examples, the chroma, hue, luminance values for the test pixel are not successfully converted to valid RGB values because they are outside the target or source color gamut. For instance, the display device 140 can display colors within an HD color gamut. If the test pixel has chroma, hue, and luminance values are outside of the HD color gamut, then the display device 140 cannot display the test pixel. In such instances, the chroma value reduction or incrementation unit 526 reduces the test chroma value by a pre-defined value (e.g., a course value) and sends or transmits data 528, such as the reduced test chroma value, to the pixel creation unit 512. The pixel creation unit 512 generates another pixel using the reduced test chroma value and the process repeats until a valid RGB value for the source color gamut and the target color gamut is determined.

In some examples, the chroma, hue, and luminance values for the test pixel are inside the target or source color gamut and are successfully converted to valid RGB values. In such instances, the chroma value reduction or incrementation unit 526 determines or identifies whether the chroma, hue, and luminance values for the test pixel are at an edge or a surface of the source color gamut or the target color gamut. For example, the chroma value reduction or incrementation unit 526 takes the last chroma value that failed the conversion and reduces that value by a smaller value or amount (e.g., a fine value). Then, the chroma value reduction or incrementation unit 526 sends or transmits data 528, such as the new test chroma value, to the pixel creation unit 512. The pixel creation unit 512 uses the new test chroma value to generate a new test pixel and test the conversion of the new test pixel.

In the new iteration of the process, if the valid RGB color determination unit 520 determines that the new test pixel successfully converts to valid RGB values, then the chroma value reduction or incrementation unit 526 determines that the new test chroma value at an edge or a surface of the source color gamut or the target color gamut. The chroma value reduction or incrementation unit 526 then stores the new test chroma value in the corresponding entry for the hue and luminance.

If the valid RGB color determination unit 520 determines that the new test pixel is converted to invalid RGB values, then the chroma value reduction or incrementation unit 526 decreases the chroma value again. The process repeats until the valid RGB color determination unit 520 determines that the new test pixel successfully converts to a valid RGB value. Then, the chroma value reduction or incrementation unit 526 stores the test chroma value in the corresponding entry for the hue and luminance.

After determining the source edge chroma values 830 and the target edge chroma values 840 for each entry, the chroma value reduction or incrementation unit 526 sends or transmits the table to memory 332. The memory 332 stores this table as the gamut mapping color gradient preservation table 338.

In some implementations, the pixel creation unit 512 initially generates a test pixel with a very high test chroma value (e.g., a value of 2.0 or greater). For example, assuming the source color gamut is in BT.2020, the target color gamut is in BT. 709, and the ICh values are derived from either the ICtCp or the IPT color space, the target color gamut on average has a target edge chroma value of 0.8 and the source color gamut on average has a source edge chroma value of 1.4. After each unsuccessful conversion of the test pixel resulting in invalid RGB values, the chroma value reduction or incrementation unit 526 reduces the test chroma value by a course pre-defined value, such as 0.0001. Then, after a successful conversion of the test pixel, the chroma value reduction or incrementation unit 526 uses the last chroma value that failed the conversion and reduces that value by a fine pre-defined value, such as 0.000001, as described above. In such implementations, the gamut pre-processing logic 324 uses these course and fine pre-defined values to reduce the number of iterations or computations required to perform the steps above.

The gamut pre-processing logic 324 generates the gamut mapping color gradient preservation table prior to converting the plurality of source color gamut pixels 110 to the plurality of target color gamut pixels 130 as described at step 204. In other words, the gamut pre-processing logic 324 generates the table prior to run-time. In some implementations, by generating the gamut mapping color gradient preservation table prior to run time, the logic 120 processes the conversion of the plurality of source color gamut pixels 110 to the plurality of target color gamut pixels 130 faster. This allows the logic 120 to process video/movie frames as the video/movies frames that are being received by the apparatus 300 in real time. Thus, the display device 140 displays or shows a continuous stream of video/movies frames that have been converted to the target color gamut pixels 130.

Referring back to FIG. 4, at step 408, the apparatus 300 (e.g., the gamut pre-processing logic 324 and/or the gamut mapping color gradient preservation logic 120) converts the plurality of source color gamut pixels 110 to the plurality of target color gamut pixels 130 based on the gamut mapping color gradient preservation table. Now, referring back to FIG. 2, step 408 is one example of a method to perform step 204. However, step 408 and the disclosure that follows should not be read to be the only example to perform step 204. As those having ordinary skill in the art will appreciate, step 204 can be performed in various different ways and orders, such as but not limited to the method described below with reference to step 408. Step 408 will be described with reference to FIGS. 6 and 7. However, any suitable structure can be employed.

FIG. 6 illustrates an example of the tone mapping logic 330. The tone mapping logic 330 performs conventional tone mapping operations, such as performing luminance mapping operations. For example, the tone mapping logic 330 maps luminance values from one set of colors in a HDR color gamut to another set of colors in a more limited color gamut. The tone mapping logic 330 includes color conversion units 602, 608, 612, and 620, a RGB to display range conversion unit 624 and a conversion matrix unit 628. Although these sub-units 602, 608, 612, 620, 624, and 628 are illustrated as children units subordinate of the parent unit, each sub-unit can be operated as a separate unit from the tone mapping logic 330, and other suitable combinations of sub-units are contemplated to suit different applications. In another implementation, one or more units can be selectively bundled as a software model running on the processor or co-processor. In some implementations, the tone mapping logic 330 is separate from the gamut mapping color gradient preservation logic 120. In other implementations, the gamut mapping color gradient preservation logic 120 and the tone mapping logic 330 are combined to a single unit or logic. Further, in yet additional implementations, the gamut mapping color gradient preservation logic 120 includes one or more sub-units (e.g., sub-units 602, 608, 612, 620, 624, and 628) of the tone mapping logic 330.

As described previously, the apparatus 300 obtains image data. The memory 332 stores the source video/movie frame or the source image in a frame buffer, such as a source frame or image frame buffer 334. The tone mapping logic 330 obtains (receives and/or retrieves) the video frame or image 600 from memory 332, such as from the source frame or image frame buffer 334. In particular, the color conversion unit 602 obtains (receives and/or retrieves) the video frame or image 600. After obtaining the video frame or image 600, the color conversion unit 602 converts the pixels of the video frame or image 600 (e.g., the source color gamut pixels 110) between different color spaces. In some implementations, the color conversion unit 602 converts the source color gamut pixels 110 from a Luma Chrominance (YUV) color space to a RGB color space to a XYZ color space to a LMS linear color space to a LMS non-linear color space. For example, the source color gamut pixels 110 initially are in a YUV color space. The color conversion unit 602 converts the source color gamut pixels 110 from the YUV color space to the RGB color space. Next, the color conversion unit 602 converts from the RGB color space to the XYZ color space and so on.

In some implementations, the color conversion unit 602 uses a conversion matrix 604, such as a conversion matrix from a source color gamut to XYZ space, to convert between the different color spaces. For example, as mentioned previously, the gamut mapping conversion matrix logic 326 generates matrixes for converting between different color spaces. The color conversion unit 602 obtains (e.g., receives and/or retrieves) the matrixes from the memory 332 and uses these matrixes to convert between different color spaces (e.g., from a source color gamut, such as a RGB color gamut, to the XYZ color space).

After the conversion process, the color conversion unit 602 provides data 606, such as the converted video frame or image 600, to the color conversion unit for nonlinear space 608. The color conversion unit for nonlinear space 608 performs further conversions of the source color gamut pixels 110 for the video frame or image 600.

The color conversion unit for nonlinear space 608 converts from the LMS nonlinear color space to the intensity, blue-yellow chroma component, and the red-green chroma component (ICtCp) color space. By converting to the ICtCp color space, the color conversion unit for nonlinear space 608 determines values for the intensity, the blue-yellow chroma component, and the red-green chroma component.

In some implementations, after converting to the ICtCP color space, the color conversion unit for nonlinear space 608 performs luminance mapping operations for the intensity or luminance value s (e.g., the I value in the ICtCp color space). This process is known in the art and can be performed in any suitable way. For example, an International Telecommunication Union (ITU) report titled "High dynamic range television for production and international programme exchange" describes a process for performing luminance mapping operations. (Report ITU-R BT.2390-3, *High dynamic range television for production and international programme exchange,* 2017).

In some implementations, after performing the luminance mapping operations, the color conversion unit for nonlinear space 608 scales the chroma values (e.g., the Ct and the Cp values in the ICtCp color space) based on the new luminance values. For example, to convert from HDR luminance values to SDR luminance values, the color conversion unit for nonlinear space 608 reduces the luminance values. After reducing the luminance values and as known in the art and described in the article above, the color conversion unit for nonlinear space 608 scales the chroma values (e.g., the Ct and Cp values) based on this reduction of the luminance values.

Afterwards, the color conversion unit for nonlinear space 608 converts from the ICtCp color space to the LMS nonlinear color space. Then, the color conversion unit for nonlinear space 608 provides data 610, such as the LMS nonlinear color space values, to the color conversion unit 612.

The color conversion unit 612 converts from the LMS nonlinear color space to the LMS linear color space. The color conversion unit 612 then provides the LMS pixels 614 to the gamut mapping color gradient preservation logic 120. In some variations, the color conversion unit for nonlinear space 608 can provide data 610, such as the LMS nonlinear color space values, directly to the gamut mapping color gradient preservation logic 120. In such instances, the tone mapping logic 330 might not include the color conversion unit 612.

FIG. 7 illustrates an example of the gamut mapping color gradient preservation logic 120. The gamut mapping color gradient preservation logic 120 includes color conversion unit 700, table indexing unit 706, table extraction unit 712, linear computation unit 716, and/or curve computation unit 722, and color conversion unit 726. Although these sub-units 700, 706, 712, 716, 722, and 726 are illustrated as children units subordinate of the parent unit, each sub-unit can be operated as a separate unit from the gamut mapping color gradient preservation logic 120, and other suitable combinations of sub-units are contemplated to suit different applications. In another implementation, one or more units can be selectively bundled as a software model running on the processor or co-processor.

The color conversion unit 700 obtains LMS pixels 614 from the tone mapping logic 330. As mentioned previously, the LMS pixels 614 can be either LMS linear pixels or LMS non-linear pixels. After obtaining the LMS pixels 614, the color conversion unit 700 converts the pixels from the LMS color space to the ICtCp color space. Then, the color conversion unit 700 converts the pixels from the ICtCp color space to the ICh color space. As mentioned previously, the ICh color space is the luminance, chroma, hue color space. In other words, the color conversion unit 700 converts the LMS pixels 614 to hue values, luminance values, and chroma values. Afterwards, the color conversion unit 700 transmits or sends data 702, such as the hue values, the luminance values, and the chroma values for the source color gamut pixels 110, to the table indexing unit 706.

The table indexing unit 706 obtains the hue values, the luminance values, and the chroma values for the source color gamut pixels 110. The table indexing unit 706 transmits or sends commands 704 to obtain the source edge chroma value 830 and the target edge chroma value 840 from memory 332 (e.g., from the gamut mapping color gradient preservation table 338). The commands 704 include hue and luminance values for the pixels. As mentioned previously, in one variation, each entry of the gamut mapping color gradient preservation table 338 includes a hue value 810 between 0-359, a luminance value 820 between 0-10,000, a source edge chroma value 830, and a target edge chroma value 840. Based on a pixel's hue value and luminance value, the table indexing unit 706 generates one or more commands to obtain the source edge chroma value 830 and the target edge chroma value 840 for the corresponding entry.

The table extraction unit 712 obtains the hue values, the luminance values, and the chroma values for the source color gamut pixels 110 from the table indexing unit 706. Further, the table extraction unit 712 obtains (e.g., retrieves and/or receives) data 710, such as the target edge chroma value 840 and the source edge chroma value 830, from memory 332 (e.g., from the gamut mapping color gradient preservation table 338). In some variations, the table extraction unit 712 obtains a target edge chroma value 840 and a source edge chroma value 830 based on the same hue value and the same luminance value. For example, multiple pixels can have the same hue value and the same luminance value, but different chroma values. In such examples, the table extraction unit 712 obtains one target edge chroma value 840 and one source edge chroma value 830 for the particular hue and luminance value.

The table extraction unit 712 sends or transmits data 714, such as the target edge chroma value 840, the source edge chroma value 830, the hue values, the luminance values, the chroma values for the source color gamut pixels 110, to the linear computation unit 716 and/or the curve computation unit 722.

In some implementations, the table extraction unit 712 sends or transmits each pixel of the source color gamut pixels 110 separately to the linear computation unit 716 and/or the curve computation unit 722. In some implementations, the table extraction unit 712 sends or transmits groups or a plurality of source color gamut pixels 110 to the linear computation unit 716 and/or the curve computation unit 722. For example, the table extraction unit 712 sends or transmits a plurality of source color gamut pixels 110 with the same hue and luminance values.

In some variations, to convert the plurality of source color gamut pixels 110 to the plurality of target color gamut pixels 130, the gamut mapping color gradient preservation logic uses the linear computation unit 716. In other variations, the gamut mapping color gradient preservation logic uses the curve computation unit 722. Either unit can be used to transform the pixels.

After obtaining the data 714, the linear computation unit 716 or the curve computation unit 722 determines a plurality of target chroma values within the target color gamut based on the target edge chroma value 840 and the source edge chroma value 830.

Figure 9:
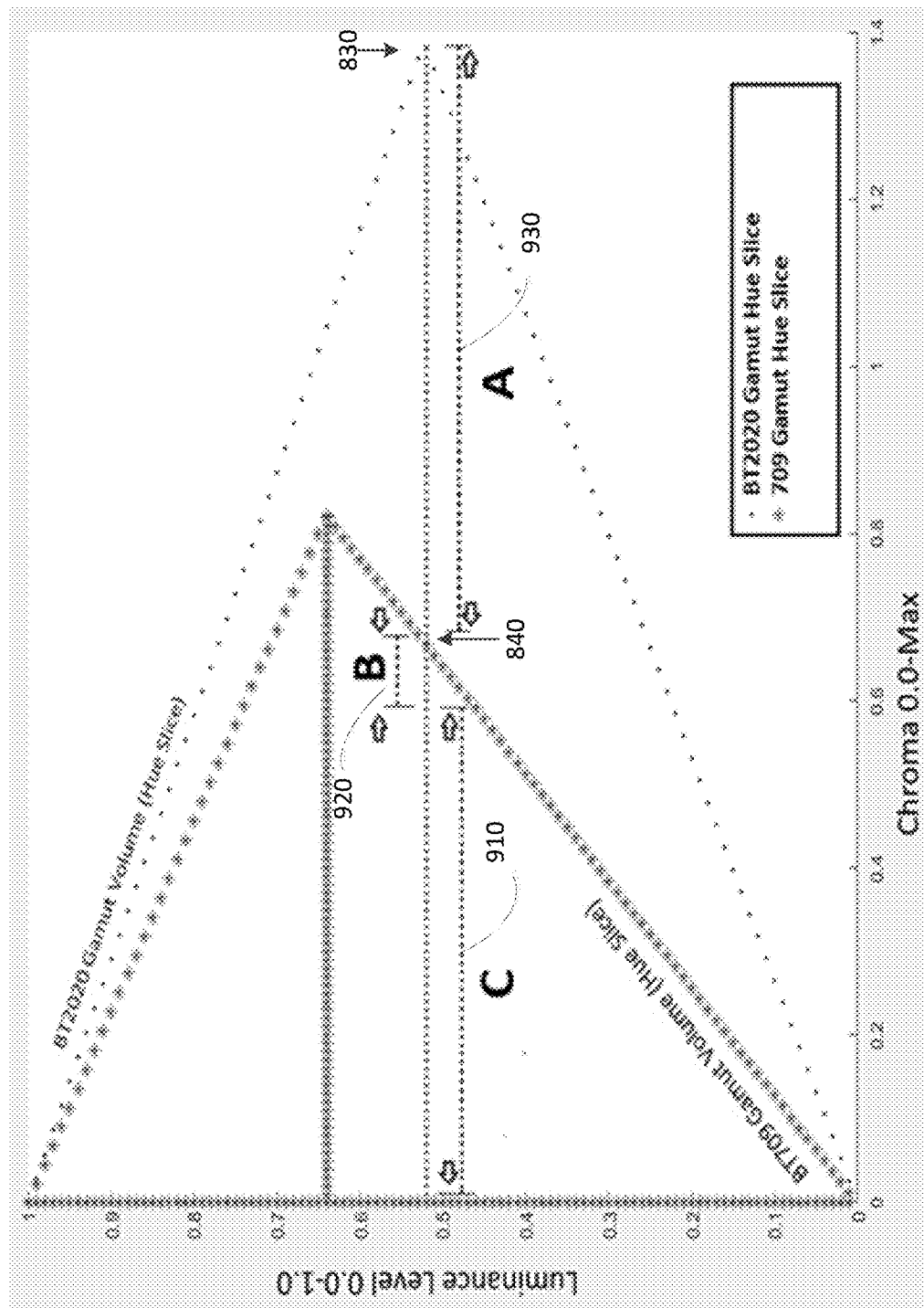
FIG. 9 is an exemplary pictorial representation of the operation of logic for preserving color gradients during gamut mapping in accordance with one embodiment set forth in the disclosure.

FIG. 9 illustrates pictorially, operation of the logic for preserving color gradients during gamut mapping and will be referenced to determine the plurality of target chroma values within the target color gamut. In particular, FIG. 9 shows various chroma values at a same hue slice (e.g., degree or value) and a same luminance value. Point 830 shows the source edge chroma value and point 840 shows the target edge chroma value that were obtained previously. Range 910 (referred to C), range 920 (referred to B), and range 930 (referred to A) illustrate various chroma ranges for the same hue value and the same luminance value. For example, the combination of A 930, B 920, and C 910 represents the source color gamut. The combination of C 910 and B 920 represents the target color gamut. Range B 920 refers to a belt area or a pre-defined range of belt chroma values adjacent to the target edge chroma value 840.

In some implementations, the linear computation unit 716 or the curve computation unit 722 determines A 930 from the source edge chroma value 830 and the target edge chroma value 840 (e.g., the source edge chroma value 830 minus the target edge chroma value 840). In this example, the linear computation unit 716 or the curve computation unit 722 determines C 910 from a ratio or proportion (e.g., 90%) of the target edge chroma value 840. And, range C 910 is from 0 to 90% of the target edge chroma value 840. In some variations, range C 910 is from 0 to 75% of the target edge chroma value 840. After determining A 930 and C 910, the linear computation unit 716 or the curve computation unit 722 determines B 920 from the source edge chroma value 830, A 930, and C 910 (e.g., the source edge chroma value 830 minus A 930 and C 910).

In some examples, the ratio or proportion is fixed. For example, the linear computation unit 716 obtains a programmable pre-defined ratio (e.g., 90%, 80%, 75%) from a programmer or developer during implementation. In other examples, the ratio or portion varies. For example, the curve computation unit 722 uses a variable ratio (e.g., a ratio between 75%-90%) to determine C 910.

In some variations, the linear computation unit 716 transforms (e.g., converts and/or maps) the source color gamut pixels 110 (that are outside the target color gamut) to the target color gamut pixels 130. For example, the linear computation unit 716 determines a compression ratio for preserving transformations from the source color gamut to the target color gamut. The compression ratio is calculated using A 930 and B 920. In one example, the compression ratio is determined by the following equation:

$$(A+B)/B.$$

Then, the linear computation unit 716 determines a chroma value in the target color gamut using the compression ratio. In one example, the chroma value in the target color gamut is determined by the following equation:

$$C+((\text{chroma value of the source color gamut pixel}-C)/\text{the compression ratio}).$$

In other words, the linear computation unit 716 compares the plurality of source chroma values for the source color gamut pixels 110 to B 920 (e.g., the pre-defined range of belt chroma values). From the comparison, the linear computation unit 716 linearly transforms (e.g., maps or converts) the chroma values of the source color gamut pixels 110 to a chroma value within B 920.

In some variations, instead of or in addition to using the linear approach, the curve computation unit 722 transforms (e.g., maps, converts, and/or compresses) chroma values of the source color gamut pixels 110 to chroma values within range B 920. By transforming the chroma values, the curve computation unit 722 transforms the source color gamut pixels 110 to the target color gamut pixels 130. For example, the curve computation unit 722 transforms the source color gamut pixels 110 to the target color gamut pixels 130 using a best fit curve, such as a Hermite curve. A Hermite curve or a cubic Hermite spline is a spline where each piece of the curve is a third-degree polynomial specified in Hermite form. In one variation, the curve computation unit 722 uses the Hermite curve described by the following code to transform the source color gamut pixels 110 to the target color gamut pixels 130:

```
// Curve Parameters
maxValue = (TargetEdgeChroma / SourceEdgeChroma);
KS = (1.5 * maxValue) − 0.5;
E2 = (ICh.C / SourceEdgeChroma);
// Compress the Source Chroma to fit in Target Boundaries (Curve fitting)
if (E2 >= KS)
{
```

-continued

```
T = (KS == 1.0) ? (E2 − KS) : ((E2 − KS) / (1.0 − KS));
ICh.C = ((((2.0*(T*T*T)) − (3.0*(T*T)) + 1.0) * KS) +
        (((T*T*T) − (2.0 * (T*T)) + T)*(1.0 − KS)) +
        (((−2.0 * (T*T*T)) + (3.0 * (T*T))) * maxValue))
        * SourceEdgeChroma;
}
```

In the code above, the curve computation unit 722 defines the maximum value of the chroma using the target edge chroma value 840 and the source edge chroma value 830 as boundaries. Then, the curve computation unit 722 multiplies the maximum value of the chroma by 1.5 to calculate a knee point. A knee point is the point at which the curve changes from substantially linear to more of a curvature. Next, the curve computation unit 722 tests for the location of the chroma. If the location is below the headroom designated by the knee points, which is equal or similar to the edge value of the B range 920, then the chroma value is not compressed or touched. If the location is beyond the edge value of the B range 920, then the chroma value is compressed, bended, and fitted inside the B range 920.

In some implementations, the linear computation unit 716 and/or the curve computation unit 722 does not transform all of the pixels in the source color gamut pixels 110 to a corresponding pixel in the target color gamut. For example, the linear computation unit 716 and/or the curve computation unit 722 does not transform (e.g., convert and/or map) or change the chroma values of the source color gamut pixels 110 within the target color gamut already, such as pixels within the C range 910. The linear computation unit 716 and/or the curve computation unit 722 only transforms the pixels within the B 920 range and the A 930 range to the B 920 range. In other words, the linear computation unit 716 and/or the curve computation unit 722 determines pixels with source chroma values within the target color gamut and maintains or does not change these source chroma values. Additionally, and/or alternatively, the linear computation unit 716 and/or the curve computation unit 722 only transforms pixels with source chroma values outside the target color gamut.

Figure 10A:
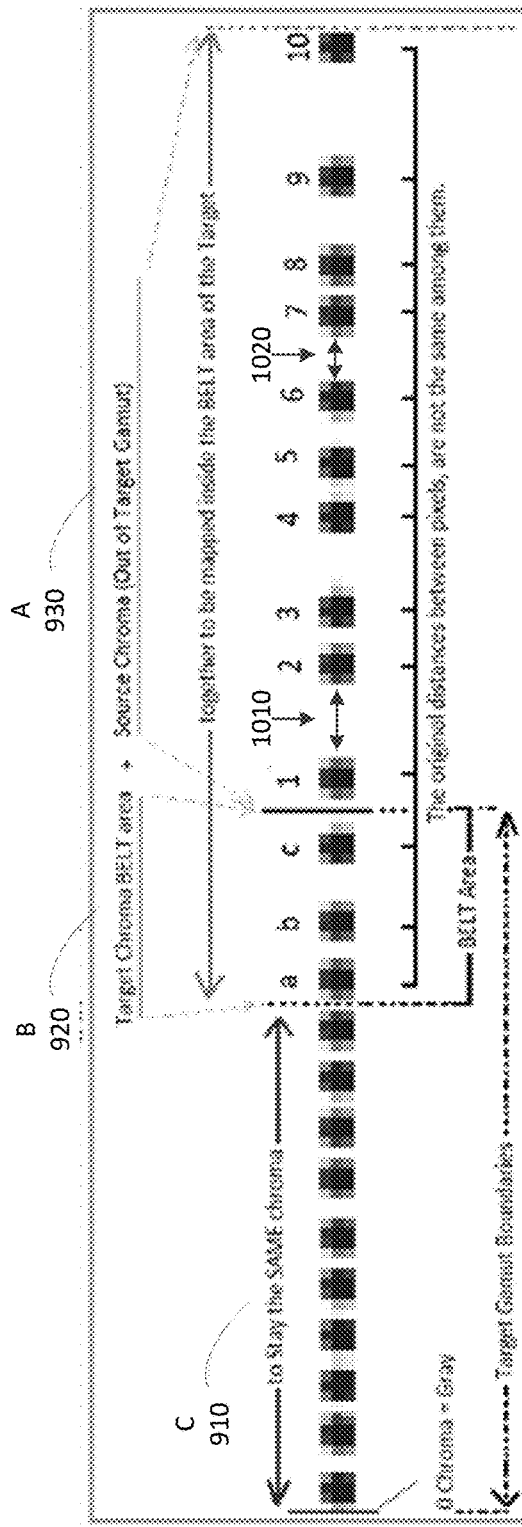
FIGS. 10A and 10B are an exemplary pictorial representation of the source color gamut pixels prior to transformation and the target color gamut pixels after transformation in accordance with one embodiment set forth in the disclosure.
Figure 10B:
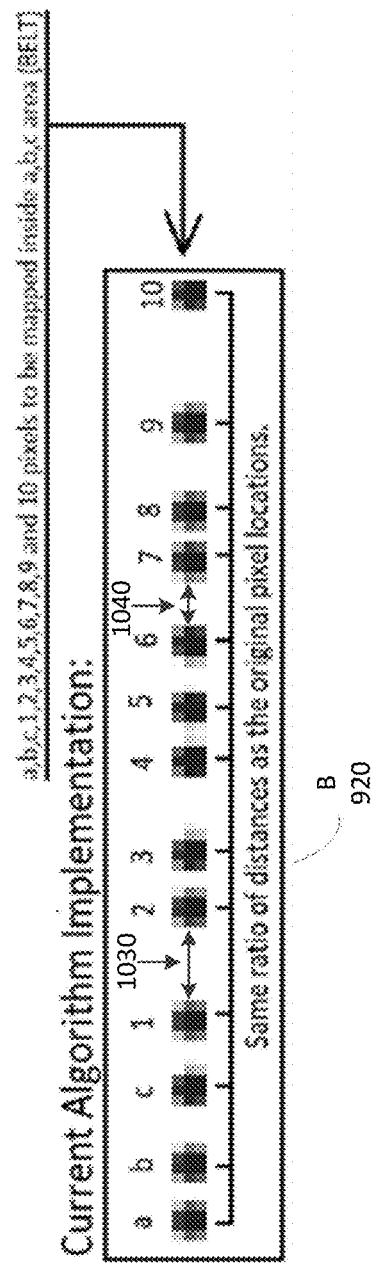

During transformation from the source color gamut to the target color gamut, the linear computation unit 716 and/or the curve computation unit 722 preserves and/or maintains the color gradient of the source color gamut pixels 110. FIGS. 10A and 10B are an exemplary pictorial representation of the source color gamut pixels prior to transformation and the target color gamut pixels after transformation. FIG. 10A shows the pixels (e.g., the source color gamut pixels 110) prior to transformation. For example, ranges A 930, B 920, and C 910 are described above with reference to FIG. 9. Each range includes a plurality of pixels. As mentioned above, the linear computation unit 716 and/or the curve computation unit 722 does not transform (e.g., convert and/or map) the pixels in the C 910 to a new chroma value within the target color gamut. The linear computation unit 716 and/or the curve computation unit 722 transform the pixels in range B 920 (e.g., a, b, c) and the pixels in range A 930 (e.g., 1, 2, 3, 4, 5, 6, 7, 8, 9, and 10). FIG. 10B shows the pixels after the transformation. Referring to FIG. 10B, the pixels in B 920 and A 930 are transformed (e.g., converted and/or mapped) to within B 920.

Further, as shown in FIGS. 10A and B, the color gradient between the pixels are preserved or maintained. For example, regardless of using the linear computation unit 716 or the curve computation unit 722, the distance ratio or width (e.g., 1010 or 1020) between two pixels (e.g., between pixel 1 and pixel 2 or between pixel 6 and pixel 7) is preserved or maintained during the transformation.

Figure 11:
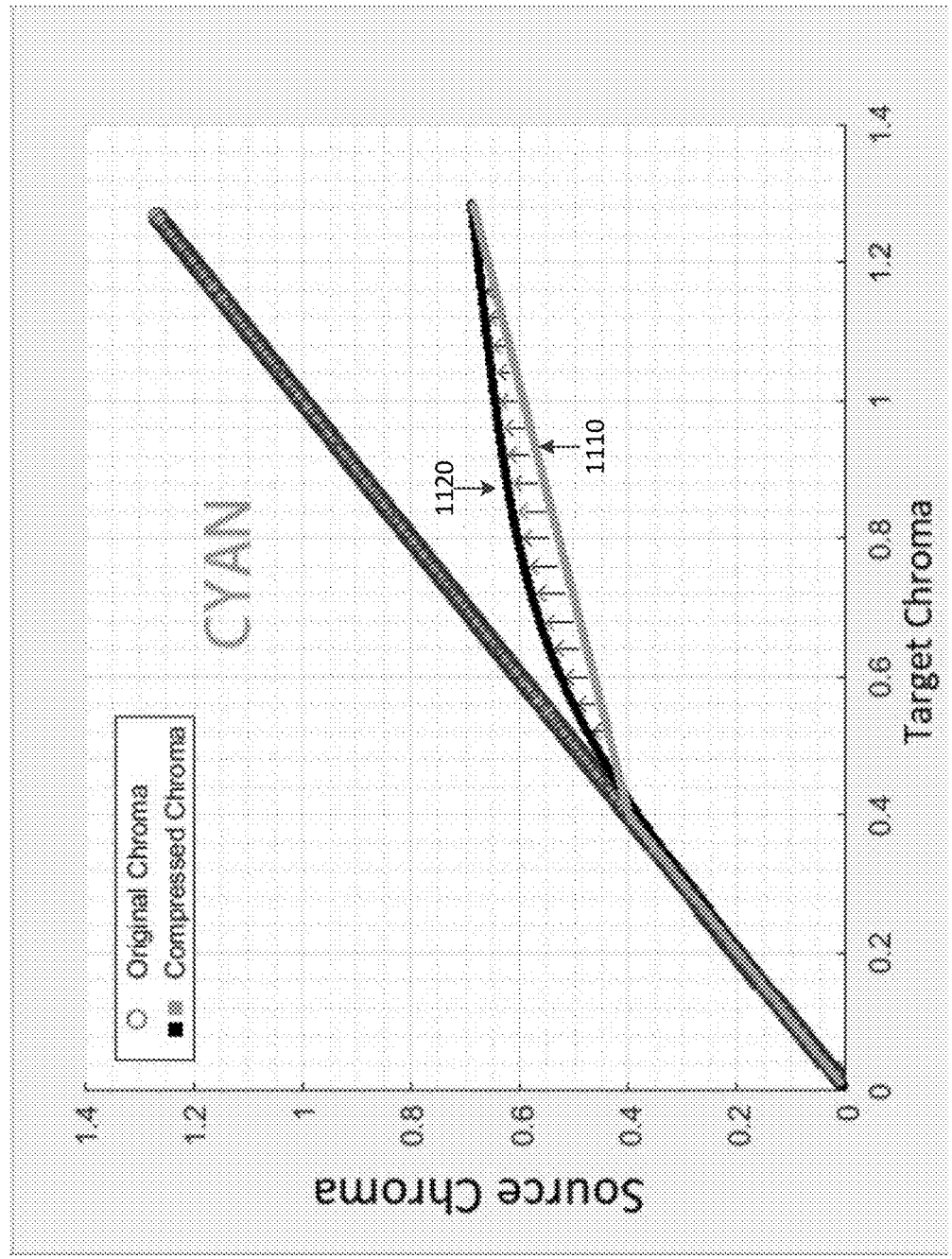
FIG. 11 is an exemplary pictorial representation of using a curve approach versus a linear approach in accordance with one embodiment set forth in the disclosure.

In some variations, the linear computation unit 716 preserves or maintains the exact color gradient or compression ratio between the pixels. FIG. 11 illustrates an example of using the curve approach versus the linear approach. For example, by using a linear approach, line 1110 shows an exact or linear transformation from the source chroma to the target chroma. For instance, if the distance 1010 between pixel 1 and pixel 2 is twice the size of the distance 1020 between pixel 6 and pixel 7, then after the transformation, the distance 1030 is again twice the size of distance 1040.

In other variations, the curve computation unit 722 preserves or maintains a color gradient that depends on the curve used for the transformation. By using the curved approach, curve 1120 still preserves or maintains the color gradient, but the preserved color gradient is a quadratic, cubic, or another non-linear transformation rather than a linear transformation, which will take advantage of most of the target gamut volume or space.

Referring back to FIG. 7, the color conversion unit 726 obtains the transformed source color gamut pixels 110 or the target color gamut pixels 130. Then, the color conversion unit 726 converts back from the ICh color space to the ICtCp color space, and from the ICtCp color space to the LMS color space. Then, the color conversion unit 726 sends or transmits the LMS pixels 616 back to the tone mapping logic 330.

Referring back to FIG. 6, the color conversion unit 620 obtains the LMS pixels 616 (e.g., the target color gamut pixels 130). Additionally, the color conversion unit 620 obtains another conversion matrix 618, similar to the conversion matrix 604, to convert between the XYZ color space and the RGB color space. Then, using the conversion matrix 618, the color conversion unit 620 converts these pixels from the LMS linear color space to the XYZ color space and from the XYZ color space to the RGB color space.

The RGB to display range conversion unit 624 converts from the RGB color range to a range able to be displayed by the display device 140 by changing the range from nominal 0.0-1.0 to the NITs range 0-10K. For example, if the display range is 0-300 Nits, a simple multiplication by 300 would translate the RGB range to the display device 140 range. After, the conversion matrix unit 628 converts from the display RGB color space to CCCs RGB color space. In some variations, WINDOWS display screens use the CCCs RGB color space. The conversion matrix unit 628 converts to the CCCs RGB color space to permit the WINDOWs operation system (OS) display system 140 to display the target color gamut pixels 130. In other variations, such as for APPLE OS display system 140, the tone mapping logic might not include the conversion CCCs matrix unit 628.

After transforming the source color gamut pixels 110 to the target color gamut pixels 130, the tone mapping logic 330 transmits or sends the target color gamut pixels 130 to memory 332. The memory 332 stores the target color gamut pixels 130 in a frame buffer, such as the target frame or image frame buffer 336. In some variations, the tone mapping logic 330 transmits or sends the target color gamut pixels 130 directly to the display device 140.

Among other technical benefits, some implementations allow UHD videos and/or images to be displayed on SD or HD display devices. For example, to display a UHD video and/or image, an apparatus needs to transform the movie and/or image from the UHD color gamut to SD or HD color gamuts. By preserving the color gradients of out of gamut pixels, more colors are perceptually mapped and the quality of the image appears more natural (e.g., more lifelike). Additionally, the in-gamut pixels of the UHD videos and/or images remain intact (e.g., preserves "memory colors" such as the color of a person's skin, the sky, flowers, greens, and so on and only maps the colors at the edge of the color gamut boundaries).

Furthermore, some implementations allow real-time conversion of pixels from UHD color gamuts to SD or HD color gamuts. For example, by using the pre-processing method to generate a gamut mapping color gradient preservation table, calculations for converting pixels from different color gamuts drastically decreases. Thus, the conversion of pixels for different color gamuts can occur in real-time (e.g., as the apparatus is obtaining the movie and/or image).

Furthermore, in some examples, the gamut mapping color gradient preservation logic 120 uses 3D look up tables (LUTs) to perform the pre-process and run-time process described above. By using a 3D LUT during runtime, the gamut mapping color gradient preservation logic 120 saves cycles and/or power.

In some variations, the method(s) described above implies reduction in gamut volume, that reduction or otherwise called compression, occurs only to the pixels of the source that are located outside the target volume. If the method(s) described above were used when reduction is not needed, such as pixels of the source all can be located inside the target gamut, the method would not move those pixels or relocate them unless they are located within the BELT area.

The above detailed description of the present disclosure and the examples described therein have been presented for the purposes of illustration and description only and not by limitation. It is therefore contemplated that the present disclosure covers any and all modifications, variations or equivalents that fall within the spirit and scope of the basic underlying principles disclosed above and claimed herein.

What is claimed is:

1. A method of mapping between color gamuts comprising:
    obtaining, by a device, a source image having a plurality of source color gamut pixels in a source color gamut, wherein the plurality of source color gamut pixels comprise a same hue value and a same luminance value and define a color gradient among chroma values of neighboring source color gamut pixels;
    converting, by the device, the plurality of source color gamut pixels to a plurality of target color gamut pixels that maintain the same hue value and same luminance value as the plurality of source color gamut pixels, such that the color gradient of the plurality of source color gamut pixels that are outside of the target color gamut is preserved by the plurality of target color gamut pixels in a target color gamut that is a more limited color gamut than the source color gamut, wherein the preserved color gradient when represented as color distances between pixels maintains a distance ratio between pixels that is the same in the source color gamut and in the target color gamut; and
    providing, by the device, for display the plurality of target color gamut pixels on a target color gamut display.

2. The method of claim 1, wherein the converting the plurality of source color gamut pixels to the plurality of target color gamut pixels such that the color gradient of the plurality of source color gamut pixels is preserved comprises:
    mapping the plurality of source color gamut pixels into a range within the target color gamut, wherein the range is less than an entire area of the target color gamut.

3. The method of claim 2, further comprising:
    obtaining, from memory and based on the same hue value and the same luminance value, a target edge chroma value corresponding to a boundary of the target color gamut, and
    wherein the range within the target color gamut is adjacent to the boundary of the target color gamut.

4. The method of claim 2, further comprising:
    determining, based on the same hue value and the same luminance value, a compression ratio for preserving transformations from the source color gamut to the target color gamut, and
    wherein the mapping the plurality of source color gamut pixels into the range within the target color gamut is based on the compression ratio.

5. The method of claim 4, wherein the determining the compression ratio is based on at least one of a linear fit or a best fit curve.

6. The method of claim 1, further comprising:
    performing a luminance mapping operation to generate the plurality of source color gamut pixels that comprise the same hue value and the same luminance value.

7. The method of claim 1, further comprising:
    determining, based on the plurality of source color gamut pixels, a plurality of source chroma values that are within the target color gamut, and
    maintaining the plurality of source chroma values that are within the target color gamut.

8. The method of claim 1, further comprising:
    obtaining source metadata corresponding to the plurality of source color gamut pixels;
    obtaining target display data corresponding to the target color gamut display;
    generating, based on the source metadata and the target display data, a gamut mapping color gradient preservation table for preserving transformations from the source color gamut to the target color gamut, and
    wherein the converting the plurality of source color gamut pixels to the plurality of target color gamut pixels is based on the gamut mapping color gradient preservation table.

9. The method of claim 8, wherein the generating the gamut mapping color gradient preservation table comprises:
    generating a plurality of entries corresponding to a plurality of hue values and a plurality of luminance values; and
    determining, for each of the plurality of entries, a valid source chroma value at an edge of the source color gamut or a valid target chroma value at an edge of the target color gamut.

10. The method of claim 9, wherein the determining the valid source chroma value or the valid target chroma value comprises:
    generating, based on a hue value of the plurality of hue values and a luminance value of the plurality of luminance values, a test pixel comprising a test chroma value; and
    determining whether the test chroma value converts to a valid red green blue (RGB) value.

11. An apparatus comprising:
    gamut mapping color gradient preservation logic configured to:
        obtain a source image having a plurality of source color gamut pixels in a source color gamut, wherein the plurality of source color gamut pixels comprise a same hue value and a same luminance value and define a color gradient among chroma values of neighboring source color gamut pixels;

convert the plurality of source color gamut pixels to a plurality of target color gamut pixels that maintain the same hue value and same luminance value as the plurality of source color gamut pixels, such that the color gradient of the plurality of source color gamut pixels that are outside of the target color gamut is preserved by the plurality of target color gamut pixels in a target color gamut that is a more limited color gamut than the source color gamut, wherein the preserved color gradient when represented as color distances between pixels maintains a distance ratio between pixels that is the same in the source color gamut and in the target color gamut; and provide for display, on a target color gamut display, the plurality of target color gamut pixels.

12. The apparatus of claim 11, wherein the gamut mapping color gradient preservation logic is further configured to convert the plurality of source color gamut pixels to the plurality of target color gamut pixels such that the color gradient of the plurality of source color gamut pixels is preserved by:
mapping the plurality of source color gamut pixels into a range within the target color gamut, wherein the range is less than an entire area of the target color gamut.

13. The apparatus of claim 12, wherein the gamut mapping color gradient preservation logic is further configured to:
obtain, from memory and based on the same hue value and the same luminance value, a target edge chroma value corresponding to a boundary of the target color gamut, and
wherein the range within the target color gamut is adjacent to the boundary of the target color gamut.

14. The apparatus of claim 13, wherein the gamut mapping color gradient preservation logic is further configured to:
determine, based on at least one of a linear fit or a best fit curve corresponding to the same hue value and the same luminance value, a compression ratio for preserving transformations from the source color gamut to the target color gamut, and
wherein the mapping the plurality of source color gamut pixels into the range within the target color gamut is based on the compression ratio.

15. The apparatus of claim 11, wherein the gamut mapping color gradient preservation logic is further configured to:
perform a luminance mapping operation to generate the plurality of source color gamut pixels that comprise the same hue value and the same luminance value.

16. The apparatus of claim 11, wherein the gamut mapping color gradient preservation logic is further configured to:
determine, based on the plurality of source color gamut pixels, a plurality of source chroma values that are within the target color gamut, and
maintain the plurality of source chroma values that are within the target color gamut.

17. The apparatus of claim 11, further comprising:
a display device, wherein the display device is configured to:
obtain the plurality of target color gamut pixels; and
display the plurality of target color gamut pixels.

18. The apparatus of claim 11, wherein the gamut mapping color gradient preservation logic is further configured to:
obtain source metadata corresponding to the plurality of source color gamut pixels;
obtain target display data corresponding to the target color gamut display;
generate, based on the source metadata and the target display data, a gamut mapping color gradient preservation table for preserving transformations from the source color gamut to the target color gamut, and
wherein the selecting the plurality of target color gamut pixels is based on the gamut mapping color gradient preservation table.

19. An integrated circuit comprising:
a first processor, wherein the first processor comprises:
gamut mapping color gradient preservation logic configured to:
obtain a source image having a plurality of pixels in a source color gamut;
performing, based on the plurality of pixels, a luminance mapping operation to generate a plurality of source color gamut pixels, wherein the plurality of source color gamut pixels comprise a same hue value and a same luminance value and define a color gradient among chroma values of neighboring source color gamut pixels;
determine a chroma range within a target color gamut that is adjacent to a boundary of the target color gamut;
determine, based on a linear fit or a best fit curve, a compression ratio for preserving transformations from the source color gamut to the target color gamut based on the color gradient among chroma values of neighboring source color gamut pixels;
convert, based on the compression ratio, the plurality of source color gamut pixels to a plurality of target color gamut pixels, wherein the plurality of target color gamut pixels are within the chroma range within the target color gamut that is adjacent to the boundary of the target color gamut;
provide for display, on a target color gamut display, the plurality of target color gamut pixels.

20. The integrated circuit of claim 19, further comprising:
a second processor, wherein the second processor comprises:
gamut pre-processing logic configured to:
obtain source metadata corresponding to the plurality of source color gamut pixels;
obtain target display data corresponding to the target color gamut display;
generate, based on the source metadata and the target display data, a gamut mapping color gradient preservation table for preserving transformations from the source color gamut to the target color gamut; and
transmit, to memory, the gradient mapping color gradient preservation table.

* * * * *